United States Patent
Chang et al.

(10) Patent No.: US 11,087,434 B1
(45) Date of Patent: Aug. 10, 2021

(54) IMAGE PROCESSING APPARATUS AND IMAGE PROCESSING METHOD

(71) Applicant: NOVATEK Microelectronics Corp., Hsin-Chu (TW)

(72) Inventors: Hua-Gang Chang, Hsinchu County (TW); Chun-Wei Lu, Taoyuan (TW); Yu-Hsiung Yin, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/831,792

(22) Filed: Mar. 26, 2020

(51) Int. Cl.
*G06T 1/60* (2006.01)
*G09G 3/20* (2006.01)

(52) U.S. Cl.
CPC ............. *G06T 1/60* (2013.01); *G09G 3/2092* (2013.01); *G09G 2360/08* (2013.01); *G09G 2360/12* (2013.01)

(58) Field of Classification Search
CPC .... G06T 1/60; G09G 3/2092; G09G 2360/08; G09G 2360/12
USPC ........................................ 345/501, 531, 545
See application file for complete search history.

(56) References Cited

U.S. PATENT DOCUMENTS

| | | | |
|---|---|---|---|
| 2016/0148582 A1* | 5/2016 | Chung | G09G 3/3611 345/89 |
| 2017/0263206 A1* | 9/2017 | Bae | G09G 5/001 |

* cited by examiner

*Primary Examiner* — Jacinta M Crawford
(74) *Attorney, Agent, or Firm* — Winston Hsu

(57) ABSTRACT

An image processing apparatus and an image processing method are provided. The image processing apparatus includes a first memory, a plurality of image processing circuits, a first image processing circuit and dithering circuit. The first memory is utilized for storing an input frame. The image processing circuits are utilized for sequentially performing respective image processing operations on the input frame to generate a first intermediate frame. The first image processing circuit is utilized for performing a first image processing operation on the first intermediate frame to generate a second intermediate frame and writing the second intermediate frame into the first memory. The dithering circuit is utilized for performing a dithering operation on the second intermediate frame transmitted from the first image processing circuit to generate a first output frame and performing the dithering operation on the second intermediate frame read from the first memory to generate a second output frame.

15 Claims, 8 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method, and more particularly, to an image processing apparatus and an image processing method capable of enhancing power saving efficiency.

2. Description of the Prior Art

With development of display technology, a modern flat panel display tends to have a larger size and higher resolution. As such, the display apparatus requires significant power consumption for operation. A panel self-refresh (PSR) function is adopted to reduce the power consumption of the display apparatus when displaying still images. Please refer to FIG. 1, which is a schematic diagram of a conventional display system 1. The display system 1 includes a processor circuit 10, an image processing apparatus 12 and a display panel 14. The image processing apparatus 12 includes a receiver circuit 120, image processing circuits IP_1-IP_n, a dithering circuit 122, an output circuit 124 and a memory 126. As shown in FIG. 1, during a normal operation mode, the receiver circuit 120 continuously receives input frames Fin from the processor circuit 10 and every input frame is sequentially processed by all of the image processing circuits of the image processing apparatus 12. The processor circuit 10 may be a TV processor which provides video source and the image processing apparatus 12 may be a timing controller. The image processing apparatus 12 generates output frames to a display driving circuit to generate data voltages driving the display panel 14.

Moreover, as shown in FIG. 1, when the processor circuit 10 provides not video but still images, the image processing apparatus 12 may enter a PSR mode, and in such a condition the receiver circuit 120 receives and provides the input frame Fin (as a still image) to the image processing circuit IP_1 and stores the input frame Fin into the memory 126, simultaneously. As shown in FIG. 2, during the PSR mode, the processor circuit 10 stops providing input frames to the image processing apparatus 12 and the image processing apparatus 12 generates output frames by repeatedly processing the input frame Fin stored in the memory 126 through the image processing circuits IP_1-IP_n and the dithering circuit 122. As long as there is no image update, the image processing apparatus 12 no longer receives input frames through the receiver circuit 112 such that power consumption of the receiver circuit 112 may be saved. More specifically, the input frame Fin read from the memory 126 may be successively processed by the image processing circuits IP_1-IP_n and thus the image processing circuits IP_n generates and outputs an intermediate frame Fn to the dithering circuit 122. The dithering circuit 122 performs a dithering operation on the intermediate frame Fn to generate an output frame Fout transmitted to the output circuit 124. The output circuit 124 outputs the output frame Fout to the display panel 14 for display. Although the processor circuit 10 stops outputting video for power saving, the repeatedly performing image processing operations by the image processing circuits IP_1-IP_n of the image processing apparatus 12 may still take large power consumption. Thus, there is a need for improvement.

SUMMARY OF THE INVENTION

It is therefore an objective of the present invention to provide an image processing apparatus and an image processing method capable of enhancing power saving efficiency to solve the abovementioned problem.

According to an embodiment of the present invention, an image processing apparatus for generating image frames to be displayed on a display panel is provided. The image processing apparatus includes a first memory, for storing an input frame; a plurality of image processing circuits, for sequentially performing respective image processing operations on the input frame to generate a first intermediate frame; a first image processing circuit, coupled to the first memory and coupled to the last stage of the plurality of image processing circuits, for performing a first image processing operation on the first intermediate frame to generate a second intermediate frame and writing the second intermediate frame into the first memory to replace the input frame with the second intermediate frame; and an dithering circuit, coupled to the first image processing circuit and the first memory, for performing a dithering operation on the second intermediate frame transmitted from the first image processing circuit to generate a first output frame and performing the dithering operation on the second intermediate frame read from the first memory to generate a second output frame next to the first output frame.

According to an embodiment of the present invention, an image processing method of an image processing apparatus for generating image frames to be displayed on a display panel is provided. The image processing apparatus includes a first memory. The image processing method includes storing an input frame into the first memory; sequentially performing respective image processing operations on the input frame to generate a first intermediate frame by a plurality of image processing circuits; performing a first image processing operation on the first intermediate frame to generate a second intermediate frame and writing the second intermediate frame into the first memory to replace the input frame with the second intermediate frame by a first image processing circuit; and performing a dithering operation on the second intermediate frame transmitted from the first image processing circuit to generate a first output frame by a dithering circuit and performing the dithering operation on the second intermediate frame read from the first memory to generate a second output frame next to the first output frame by the dithering circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
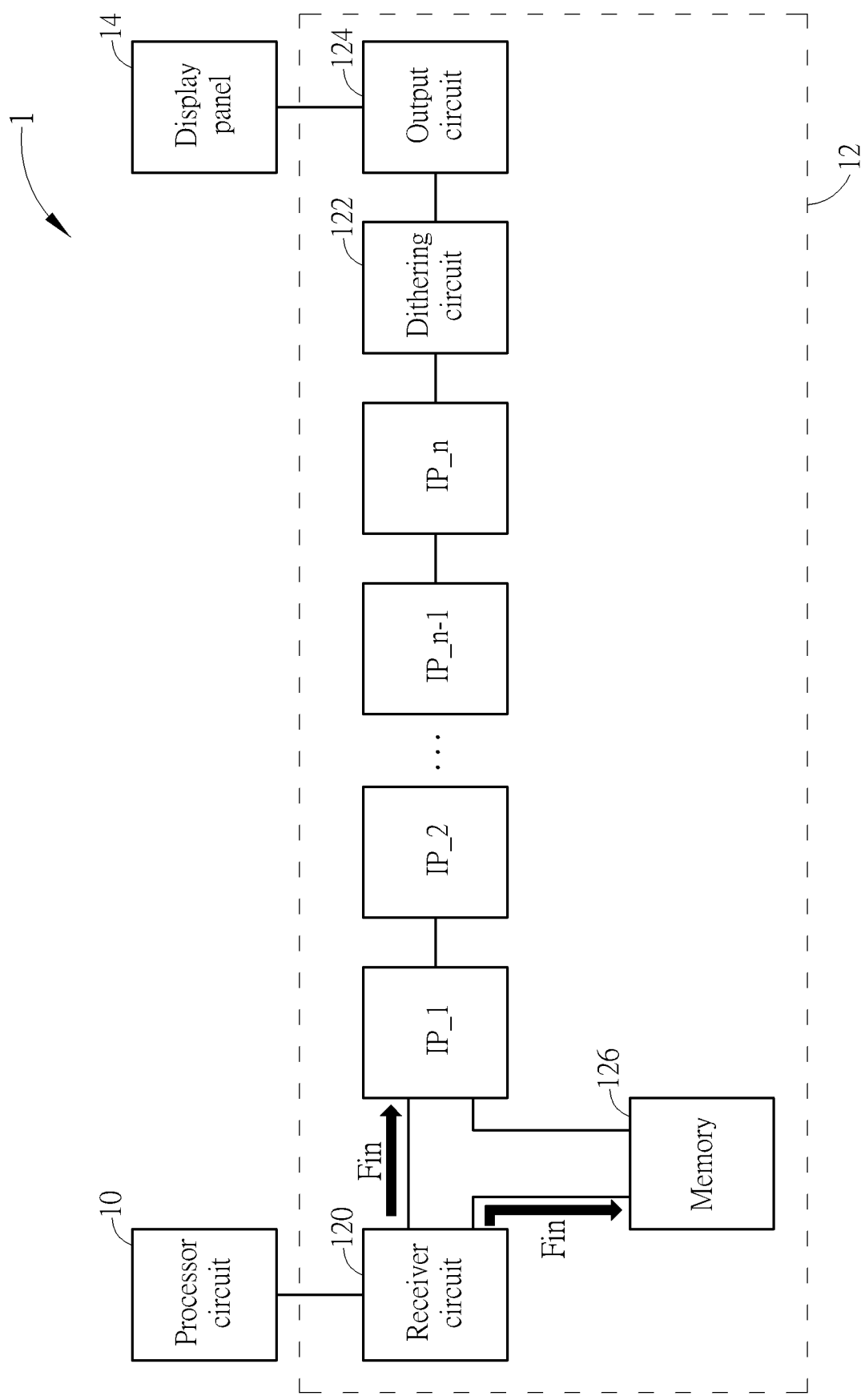
FIG. 1 is a schematic diagram of a conventional display system.
Figure 2:
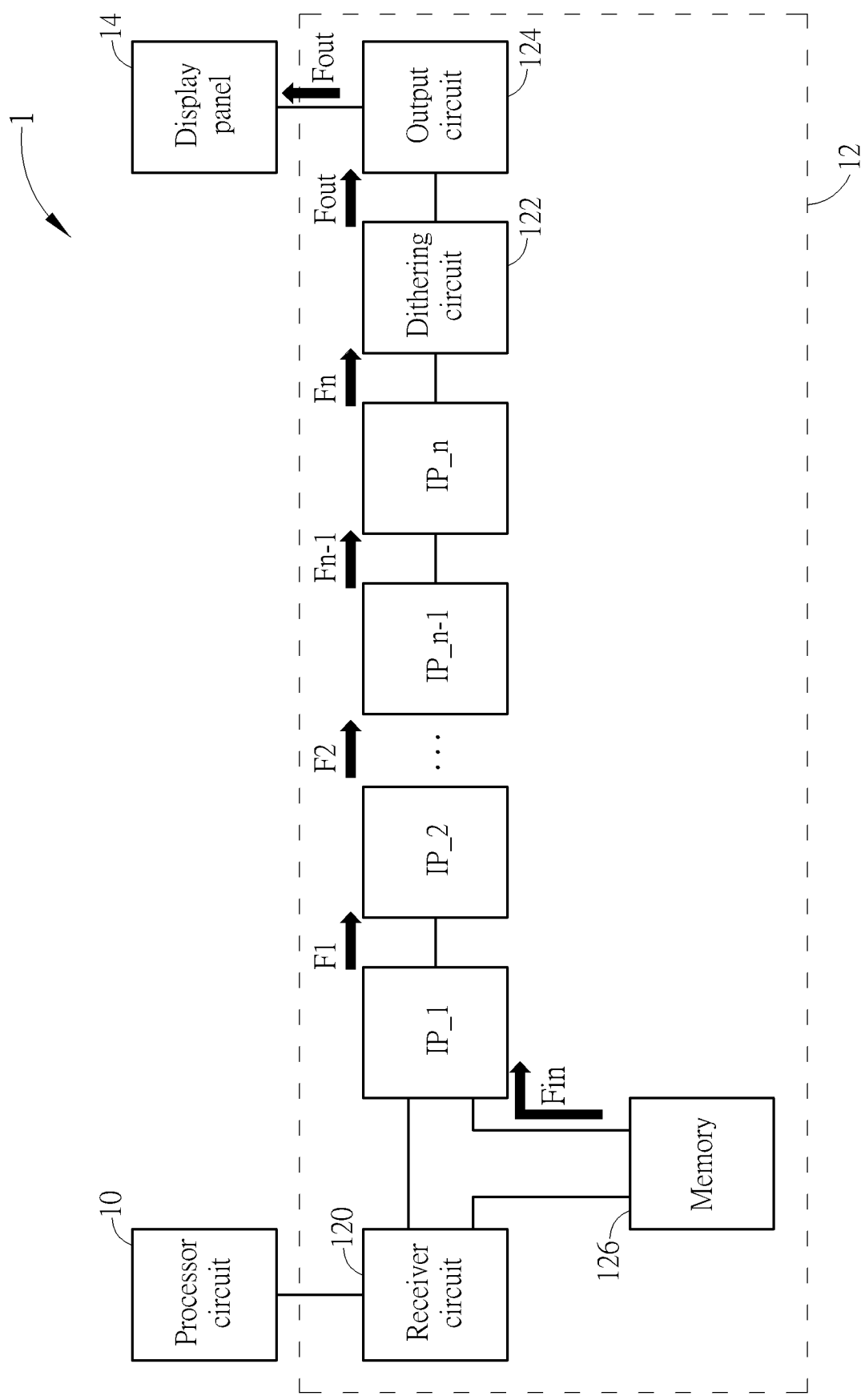
FIG. 2 is a schematic diagram illustrating the conventional display system operating in a PSR mode.
Figure 3:
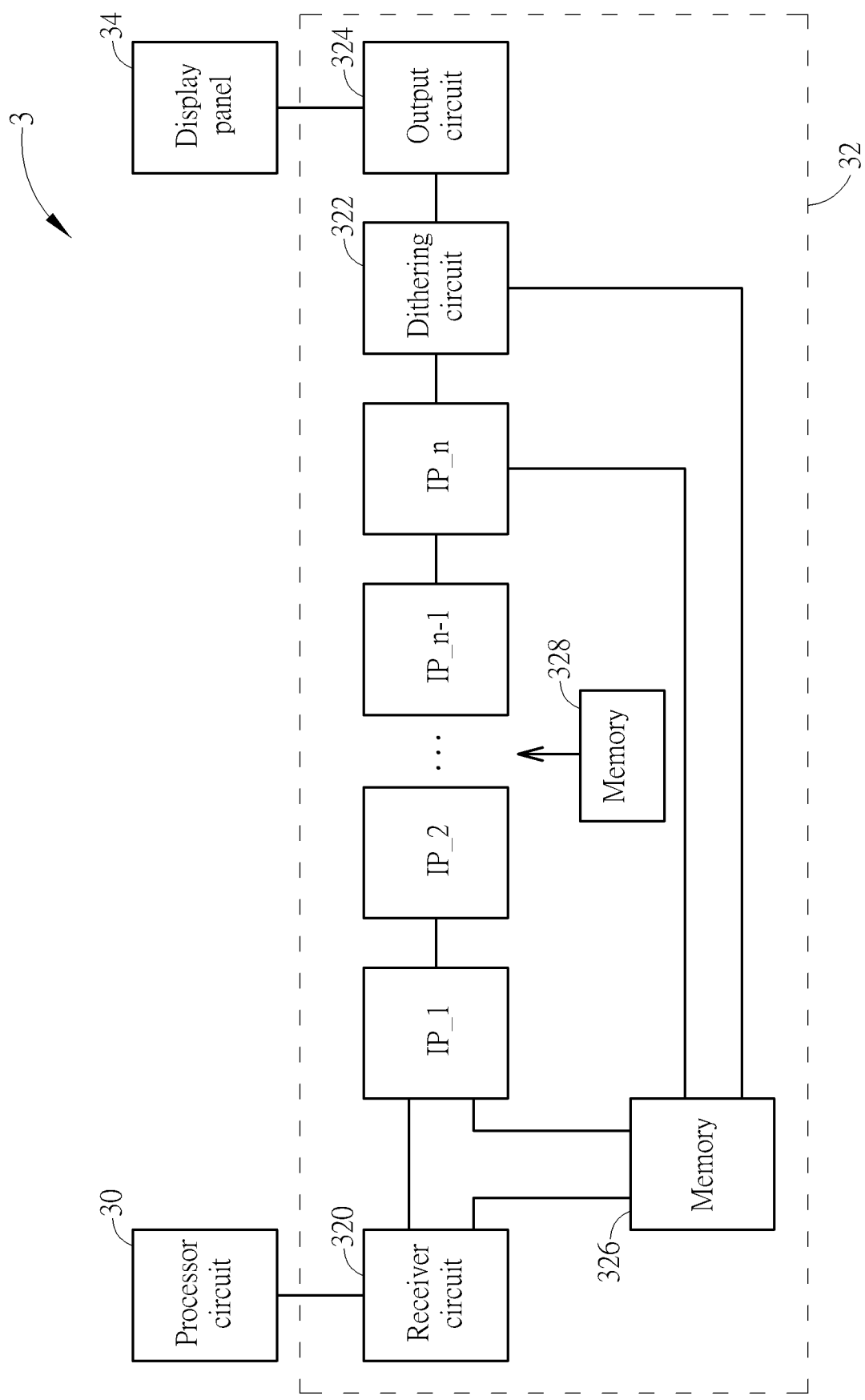
FIG. 3 is a schematic diagram of a display system according to an embodiment of the present invention.

Please refer to FIG. 3, which is a schematic diagram of a display system 3 according to an embodiment of the present invention. The display system 3 includes a processor circuit 30, an image processing apparatus 32 and a display panel 34. The processor circuit 30 may provide input frames which may be video images or still images to the image processing apparatus 32 successively. The processor circuit 30 may be a graphics processing unit (GPU), a vision processing unit (VPU), a television processor or any other video content provider providing video source. The image processing apparatus 32 is configured to generate output frames to be displayed on the display panel 34 according to the input frames. The image processing apparatus 32 may be a timing controller, and this should not be a limitation of the invention. The display panel 34 may display output frames (image frames). For example, the display panel 34 may be an organic light-emitting diode panel or a liquid crystal display panel, and this should not be a limitation of the invention. A display driving circuit which is omitted in FIGS. 3-8 may be electrically coupled to the image processing apparatus 32 for generating data voltages according to the output frames from the image processing apparatus 32 to drive the display panel 34. The image processing apparatus 32 and the display driving circuit may be separate semiconductor chips or may be integrated in one semiconductor chip.

The image processing apparatus 32 includes a receiver circuit 320, image processing circuits IP_1-IP_n, a dithering circuit 322, output circuit 324 and memories 326 and 328. The processor circuit 30 and the image processing apparatus 32 may communicate with each other through a transmission interface based on a transmission protocol, such as embedded display port (eDP) or any other transmission protocol for image transmission. The receiver circuit 320 is configured to receive input frames from the processor circuit 30. Moreover, the receiver circuit 320 is configured to output the received input frames into the memory 326 to be stored. The receiver circuit 320 is configured to provide the input frame to the image processing circuits IP_1-IP_n during a normal operation mode. The receiver circuit 302 may also receive related commands.

The image processing circuits IP_1-IP_n are configured to sequentially perform respective image processing operations on the input frame to generate an intermediate frame. The image processing circuit IP_1 is coupled to the receiver circuit 320 and the memory 326. The image processing circuit IP_2 is coupled to the image processing circuit IP_1, the image processing circuit IP_3 is coupled to the image processing circuit IP_2 and the like. Such like this, the image processing circuits IP_1-IP_n are connected in series. The image processing circuit IP_n is coupled to the image processing circuit IP_n−1, the dithering circuit 322 and the memory 326. The image processing circuits IP_1-IP_n may have different functions such as color management (CM), a high dynamic range (HDR), sub-pixel rendering (SPR), auto current detection (ACD), voltage drop conversation (VDC), gamma correction, mura compensation, or any other image processing function which may process the image frame for display purpose, wherein these image processing circuits of different functions are arranged in a preconfigured operating order. For example, the image processing circuit IP_1 may be a HDR function circuit, the image processing circuits IP_2 may be a gamma correction function circuit, the image processing circuit IP_3 may be a mura compensation function circuit, and so on.

The dithering circuit 322 is coupled to the image processing circuit IP_n and the memory 326. The dithering circuit is configured to perform a dithering operation (which is for increasing color depth) on an intermediate frame tramsmitted from the image processing circuit IP_n or read from the memory 326 to generate an output frame. The output circuit 324 transmits the output frame to the display panel 34. For example, the output circuit 324 may be a transmission interface circuit or an output buffer circuit, and this should not be a limitation of the invention. For example, the output circuit 324 may support an integrated stream protocol (iSP) interface standard, a point-to-point highspeed interface (PHI) standard or any other transmission interface standard. The display panel 34 displays the output frame. The memories 326 and 328 may be embedded dynamic random access memory (eDRAM) or dynamic random access memory (DRAM), and this should not be a limitation of the invention.

Figure 4:
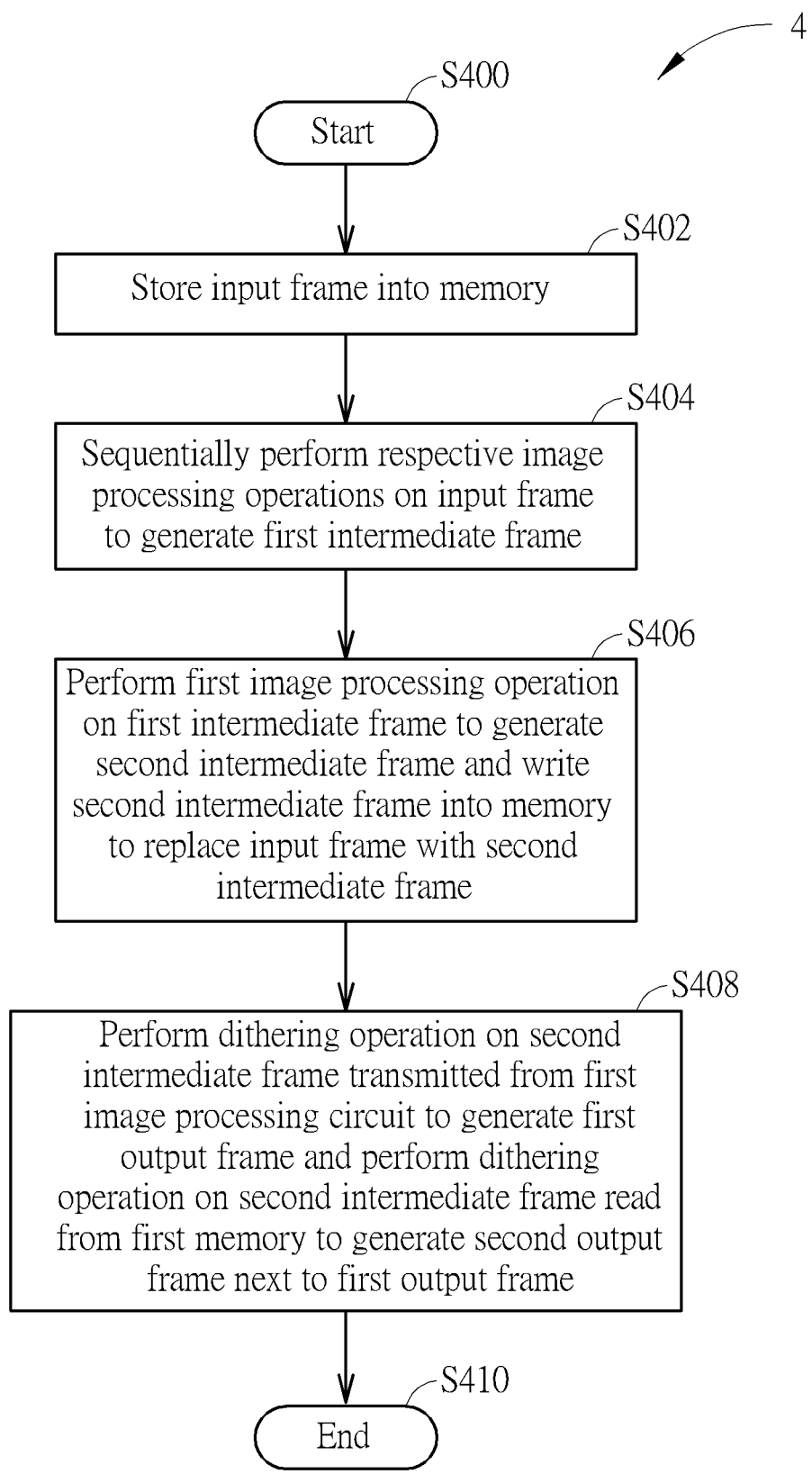
FIG. 4 is a flow diagram of a procedure according to an embodiment of the present invention.

For an illustration of the operations of the display system 3, please refer to FIG. 4. FIG. 4 is a flow diagram of a procedure 4 according to an embodiment of the present invention. The flowchart in FIG. 4 mainly corresponds to the operations on the display system 3 shown in FIG. 3. The procedure 4 includes the following steps:

Step S400: Start.

Step S402: Store an input frame into a memory.

Step S404: Sequentially perform respective image processing operations on the input frame to generate a first intermediate frame.

Step S406: Perform a first image processing operation on the first intermediate frame to generate a second intermediate frame and write the second intermediate frame into the first memory to replace the input frame with the second intermediate frame.

Step S408: Perform a dithering operation on the second intermediate frame transmitted from the first image processing circuit to generate a first output frame and perform the dithering operation on the second intermediate frame read from the first memory to generate a second output frame next to the first output frame.

Step S410: End.

Figure 5:
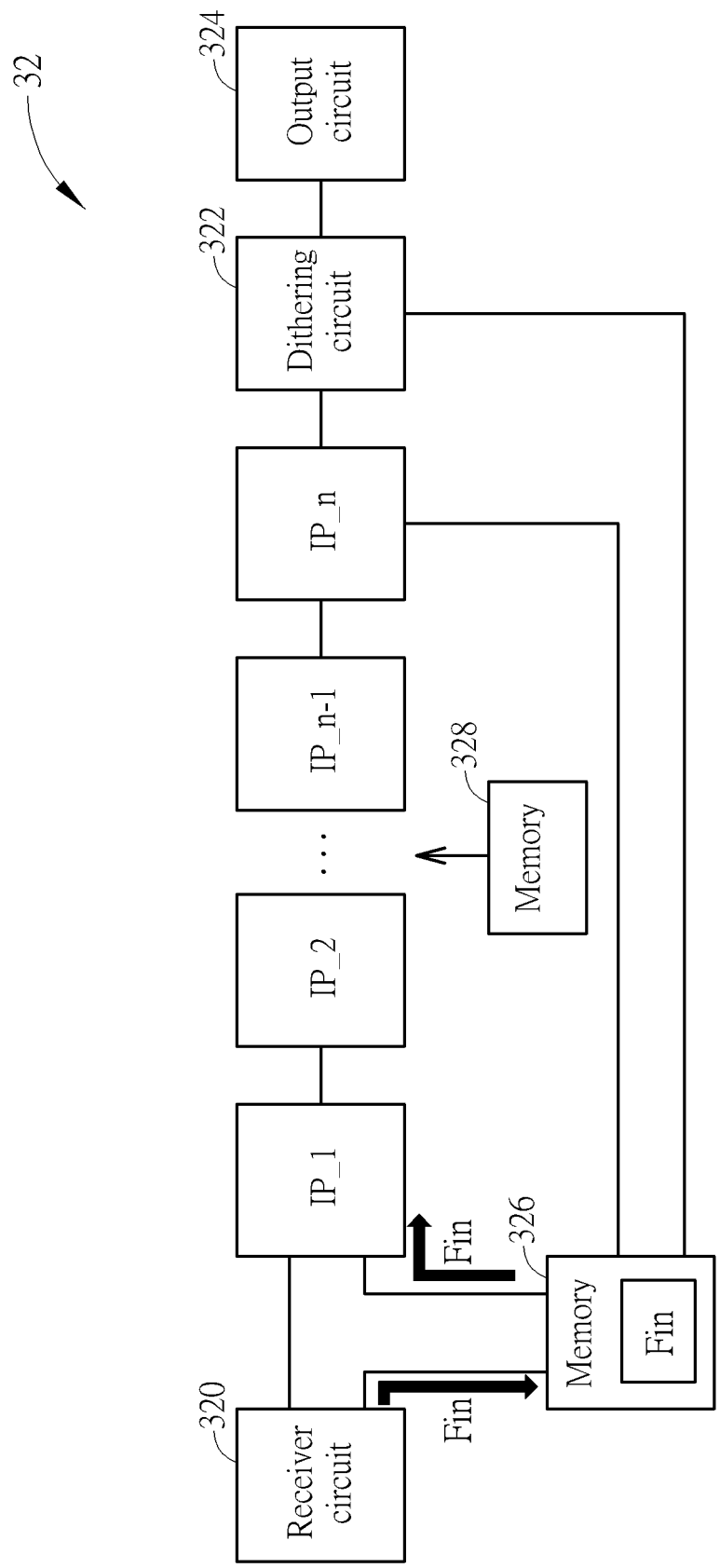
FIG. 5 to FIG. 8 are schematic diagrams illustrating operations of the display system operating in the PSR mode according to embodiments of the present invention.

According to the procedure 4, in Step S402, during a normal operation mode of the image processing apparatus 32, the receiver circuit 320 receives input frames from the processor circuit 30. The receiver circuit 320 provides the input frames to the image processing circuit IP_1 and also stores the input frames into the memory 326. When the image processing apparatus 32 enters a panel self-refresh (PSR) mode, the receiver circuit 320 receives an input frame Fin from the processor circuit 30 and stores the input frame Fin into the memory 326. For example, the receiver circuit 320 receives a panel self-refresh mode command from the processor circuit 30. While receiving the panel self-refresh mode command, the image processing apparatus 3 enters the PSR mode. The receiver circuit 320 receives an input frame Fin from the processor circuit 30 and the input frame Fin may be written into the memory 326 in response to receiving the panel self-refresh mode command. As shown in FIG. 5, the memory 326 stores the input frame Fin. The input frame Fin may be a still image or a static image. After that, the processor circuit 30 may stop providing input frames to the receiver circuit 320 during the PSR mode.

Figure 6:
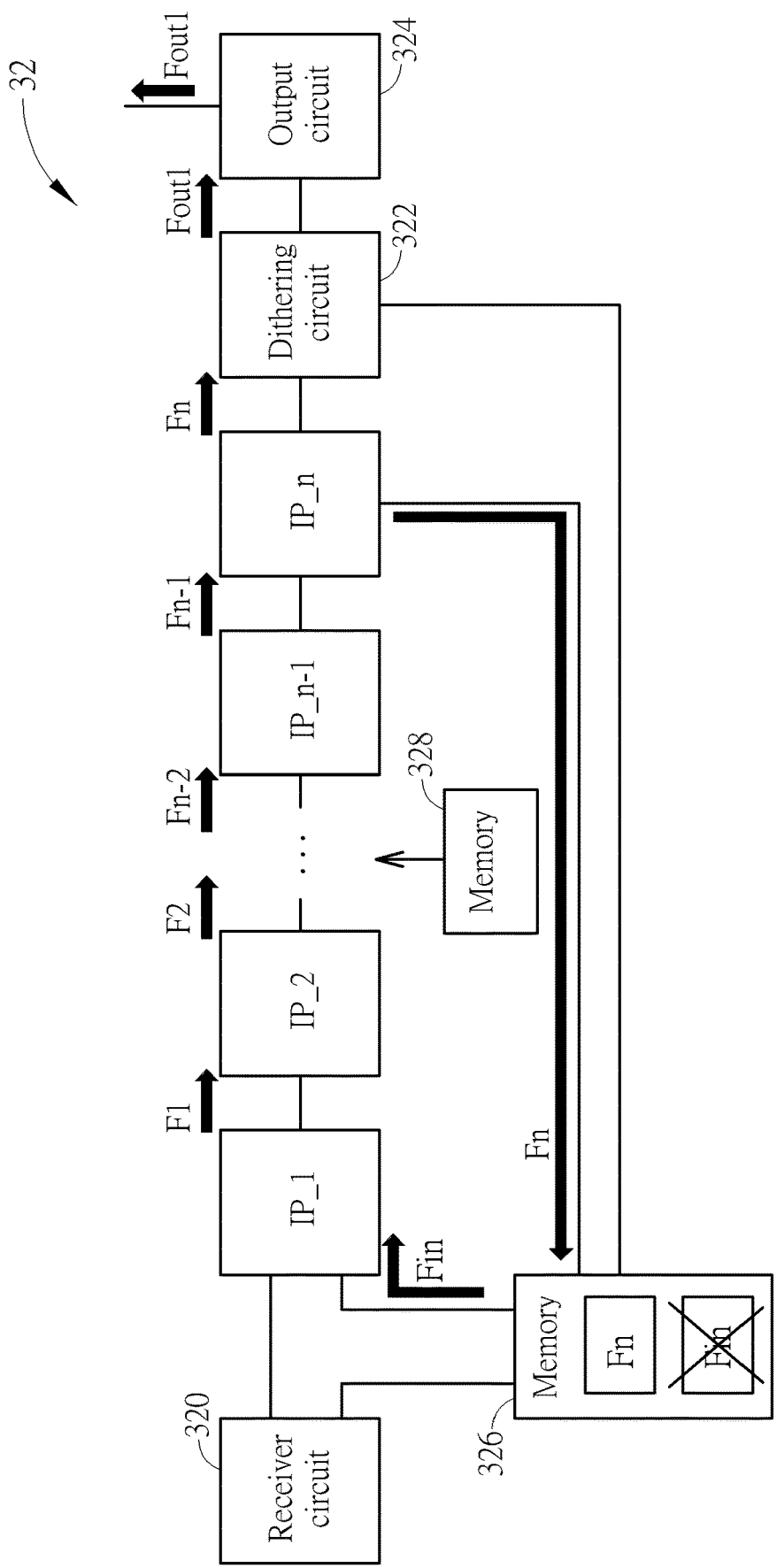

In Step S404, under the PSR mode, the image processing circuits IP_1-IP_n−1 sequentially perform respective image processing operations on the input frame Fin to generate an intermediate frame Fn−1. As shown in FIG. 5 and FIG. 6, the image processing circuit IP_1 reads the input frame Fin stored in the memory 326. As shown in FIG. 6, the image processing circuit IP_1 performs a respective image processing operation on the input frame Fin to generate an intermediate frame F1. The image processing circuit IP_1 transmits the intermediate frame F1 to the image processing circuit IP_2. The image processing circuit IP_2 performs a respective image processing operation on the intermediate frame F1 outputted from the image processing circuit IP_1 so as to generate an intermediate frame F2. Similarly, the image processing circuit IP_2 transmits the intermediate frame F2 to the image processing circuit IP_3 for the following operations. Such like this, the image processing circuit IP_n−1 performs a respective image processing operation on the intermediate frame Fn−2 outputted from the image processing circuit IP_n−2 so as to generate an intermediate frame Fn−1. The image processing circuit IP_n−1 transmits the intermediate frame Fn−1 to the image processing circuit IP_n. In other words, the image processing circuit IP_1 reads the input frame Fin stored in the memory 326 and the input frame Fin is processed by the image processing circuit IP_1-IP_n−1 in sequence.

For example, if n is 4, the image processing circuit IP_1 is a HDR function circuit. The image processing circuits IP_2 is a SPR function circuit. The image processing circuits IP_3 is a gamma correction function circuit. The image processing circuit IP_4 is a mura compensation function circuit, and the image processing circuit IP_4 is coupled to the dithering circuit 322. During the PSR mode, the image processing circuit IP_1 reads the input frame Fin stored in the memory 326 and performs an HDR image processing operation on the input frame Fin to generate an intermediate frame F1 transmitted to the image processing circuit IP_2. The image processing circuit IP_2 performs a SPR operation on the intermediate frame F1 to generate an intermediate frame F2 transmitted to the image processing circuit IP_3. The image processing circuit IP_3 performs a gamma correction operation on the intermediate frame F2 to generate an intermediate frame F3. The image processing circuit IP_3 transmits the intermediate frame F3 to the image processing circuit IP_4.

In Step S406, the image processing circuit IP_n performs a respective image processing operation on the intermediate frame Fn−1 outputted from the image processing circuit IP_n−1 so as to generate an intermediate frame Fn and write the intermediate frame Fn into the memory 326 to replace the input frame Fin with the second intermediate frame Fn. As shown in FIG. 6, the image processing circuit IP_n generates the intermediate frame Fn and transmits the intermediate frame Fn to the dithering circuit 322 and the memory 326. The intermediate frame Fn is written into the memory 326. The input frame Fin originally stored in the memory 326 is replaced with the intermediate frame Fn. For example, the input frame Fin originally stored in the memory 326 is removed or deleted from the memory 326 and the intermediate frame Fn generated by the image processing circuit IP_n is written into the memory 326 to replace the input frame Fin. In addition, the intermediate frame Fn may also be stored into a memory different from the memory 326. Please further refer to FIG. 6. The dithering circuit 322 receives the intermediate frame Fn from the image processing circuit IP_n and performs a dithering operation on the intermediate frame Fn transmitted from the image processing circuit IP_n to generate an output frame Fout1. The dithering circuit 322 transmits the output frame Fout1 to the output circuit 324. The output circuit 324 transmits the output frame Fout1 to the display panel 34. The display panel 34 displays the output frame Fout1.

Figure 7:
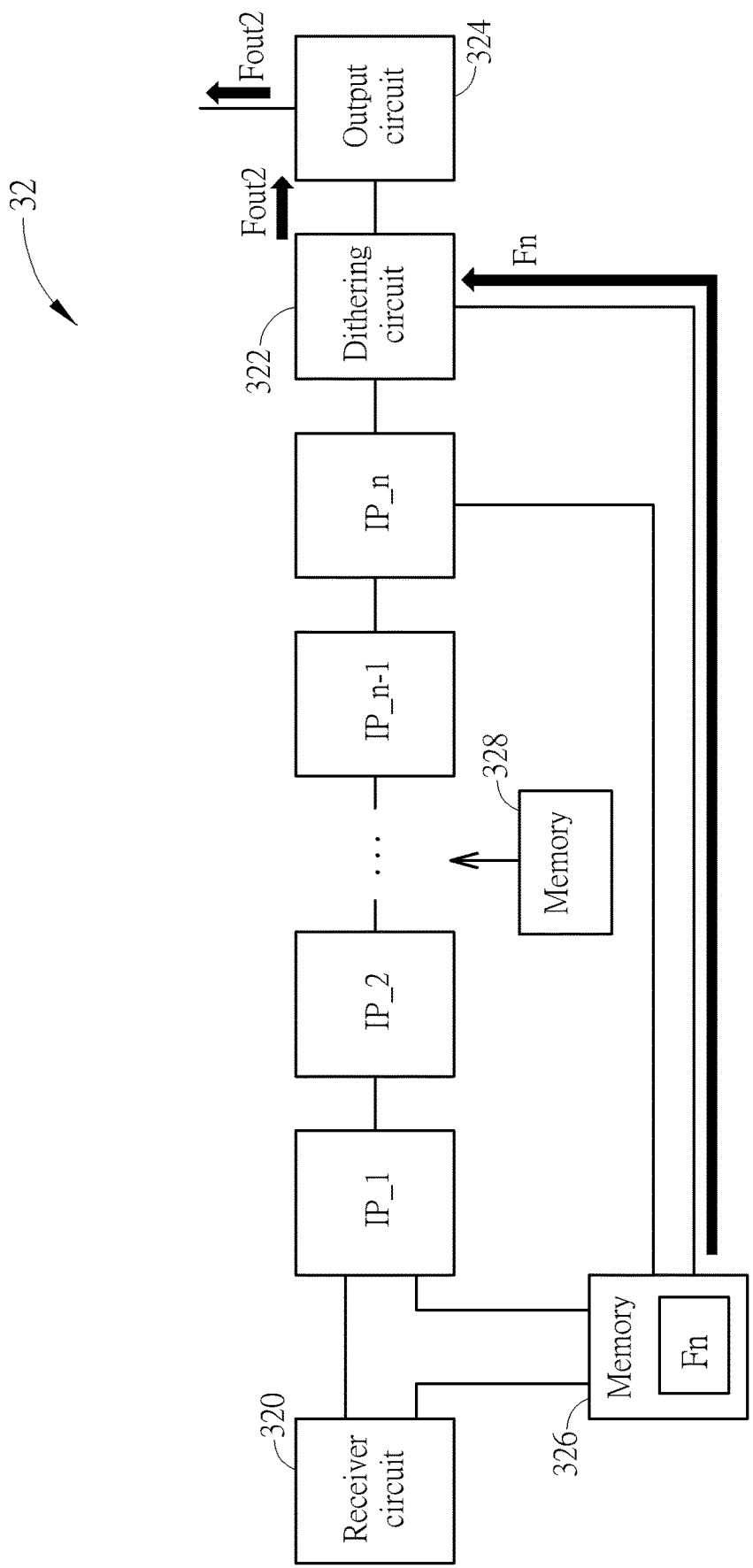

In Step S408, after the image processing circuit IP_n performs the respective image processing operation on the intermediate frame Fn−1 to generate the intermediate frame Fn and write the intermediate frame Fn into the memory 326 (as shown in FIG. 6) in Step S406, the image processing circuits IP_1-IP_n may enter into a low power consumption state such as so-called sleep state, deep-sleep state, or idle state, or may be shut down (turned off) to reduce power consumption. In the low power consumption state the image processing circuits IP_1-IP_n may stop processing images as it does in the normal state. The image processing circuits IP_1-IP_n may be switched to a stand-by state when the image processing apparatus 32 leaves the PSR mode. After receiving the intermediate frame Fn transmitted from the image processing circuit IP_n and performing the dithering operation on the intermediate frame Fn transmitted from the image processing circuit IP_n to generate the output frame Fout1, the dithering circuit 322 may read the intermediate frame Fn stored in the memory 326 and perform the dithering operation on the intermediate frame Fn read from the memory 326 to generate an output frame Fout2, as shown in FIG. 7. Similarly, the dithering circuit 322 transmits the output frame Fout2 to the output circuit 324. The output circuit 324 transmits the output frame Fout2 to the display panel 34. The display panel 34 displays the output frame Fout2. The output frame Fout2 is subsequent to the output frame Fout1.

In other words, the image processing circuits IP_1-IP_n are in the sleep (low power consumption) state during generating the output frame Fout2 and succeeding output frames. Therefore, the embodiment of the invention may consume less electrical power than the conventional PSR method during generating the output frame Fout2 and succeeding output frames, such that the power consumption of the image processing apparatus 32 may be significantly reduced and the power saving efficiency may also be significantly improved.

Figure 8:
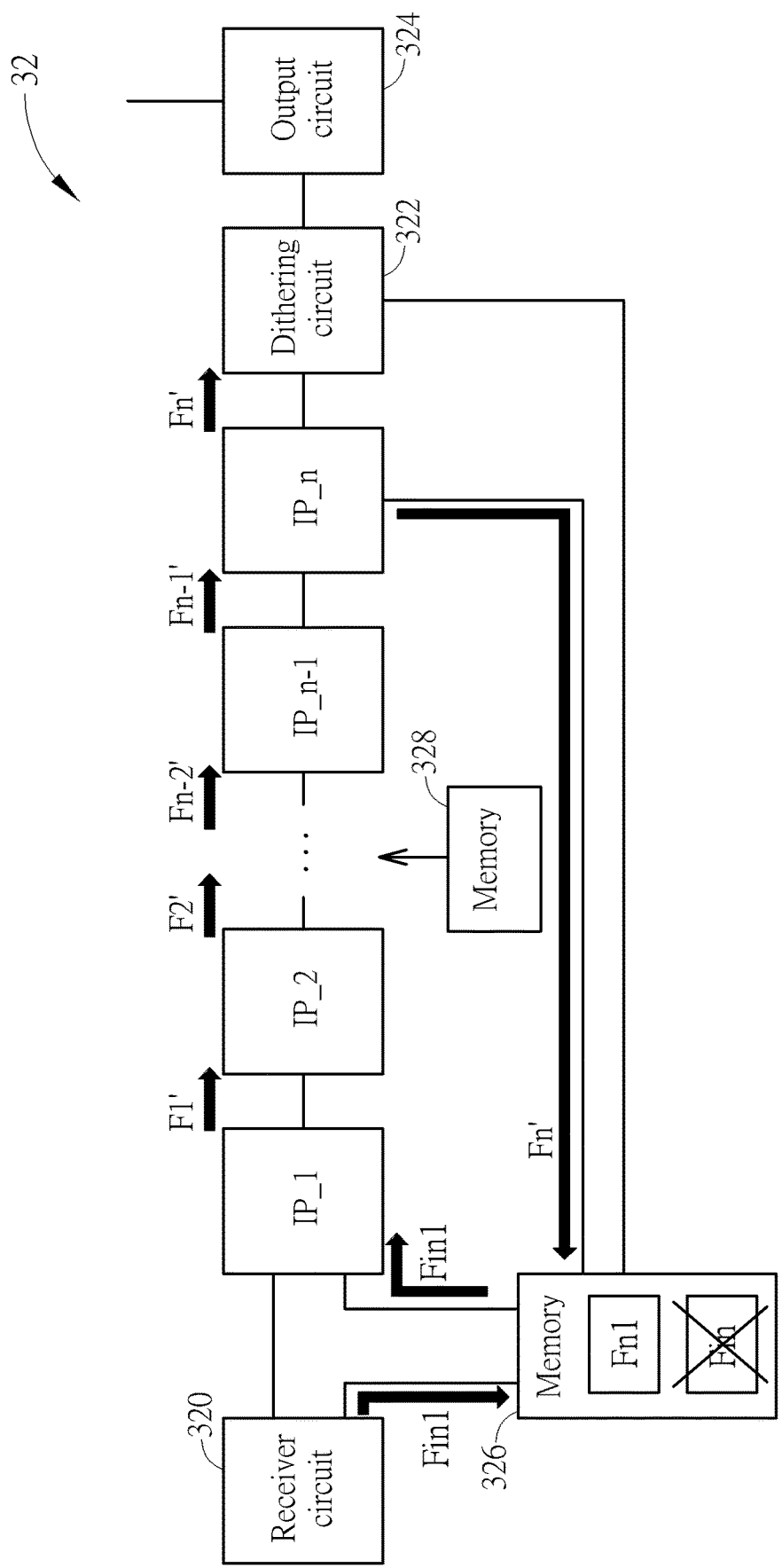

The dithering circuit 322 may periodically read the intermediate frame Fn from the memory 326 and performs the dithering operation on the intermediate frame Fn read from the memory 326 to generate subsequent output frames after the output frame Fout2 until the image processing circuits IP_1-IP_n leave the sleep state. During the PSR mode is operating, the processing circuit 30 may transmit a new still image as an update input frame to the image processing apparatus 32, and in such a condition, the image processing circuits IP_1-IP_n may be turned on or waked up from the sleep state according to a vertical synchronization signal (Vsync) in order to process the update input frame. As shown in FIG. 8, the processor circuit 30 may provide a new input frame Fin1 to the receiver circuit 320. The receiver circuit 320 receives input frame Fin1 and store input frame Fin1 into the memory 326 to replace the intermediate frame Fn (that was used for generating pervious output frames). Next, the image processing circuits IP_1-IP_n perform Step 404 and Step 406 again, similar to the illustrated in FIG. 6. As shown in FIG. 8, the image processing circuits IP_1-IP_n may sequentially perform respective image processing operations on the input frame Fin1 and generate intermediate frames F1' to Fn' and the image processing circuit IP_n may store the intermediate frame Fn' to the memory 326 (to replace the input frame Fin1). The dithering circuit 322 may perform Step 408 again to generate an update output frame and its succeeding output frames.

It is noted that under the PSR mode is operating, the earlier or later the image processing circuits IP_1-IP_n enter the low power consumption state is not limited in the embodiments of the present invention. The sooner the image processing circuits IP_1-IP_n enter the low power consumption state, the more power consumption is saved. In the mentioned embodiment illustrated in FIG. 5 to FIG. 7, the first output frame under the PSR mode is generated though the image processing circuits IP_1-IP_n then the second output frame under the PSR mode is generated by processing the stored intermediate frame in the memory 326 instead of being through the image processing circuits IP_1-IP_n and In an alternative embodiment, in Step S408, after the image processing circuit IP_n performs the respective image processing operation on the intermediate frame Fn−1 to generate the intermediate frame Fn, the intermediate frame Fn may not be written into the memory 326 and the input frame Fin is retained in the memory 326. The image processing circuit IP_1 may periodically and repeatedly read the input frame Fin from the memory 326 and the image processing circuits IP_1-IP_n may perform the respective image processing operations on the input frame Fin to generate subsequent intermediate frames and the dithering circuit 322 may perform dithering operation on the subsequent intermediate frames to generate output frames. After several iterations of repeatedly reading the input frame Fin from the memory 326 and sequentially performing respective image processing operations on the input frame Fin, the image processing circuit IP_n generates a respective intermediate frame corresponding to the last repeated iteration and writes the respective intermediate frame into the memory 326 to replace the input frame Fin. After that, the dithering circuit 322 starts to periodically read the intermediate frame stored in the memory 326 and perform the dithering operation on the intermediate frame read from the memory 326 to generate subsequent output frames. Therefore, the earlier the image processing circuit IP_n stores the intermediate frame in the memory 326 and the dithering circuit 322 starts to periodically read the intermediate frame stored in the memory 326, the lower the power consumption is reached.

In addition, at least one of the image processing circuits IP_1-IP_n includes a mura compensation circuit. The image processing circuit including the mura compensation circuit may be coupled to the memory 328. The memory 328 stores de-mura tables. The image processing circuit including the mura compensation circuit may read the de-mura tables from the memory 328. For example, when the image processing circuit IP_1 includes the mura compensation circuit, the mura compensation circuit of the image processing circuit IP_1 reads the de-mura tables from the memory 328 and performs a mura compensation operation on the input frame Fin to generate an intermediate frame F1 according to the de-mura tables. When one of the image processing circuits IP_2-IP_n includes the mura compensation circuit, the mura compensation circuit of the corresponding image processing circuit reads the de-mura tables from the memory 328 and performs a mura compensation operation on a previous intermediate frame transmitted from a previous stage of image processing circuit to generate a corresponding intermediate frame. Since accessing memory may consume large power, the sooner the image processing circuits IP_1-IP_n, which includes the mura compensation circuit, enter the low power consumption state, the more power consumption is saved.

To sum up, the embodiment of the present invention may consume less electrical power than the conventional PSR method during generating the output frame without being processed by the image processing circuits, thus significantly reducing the power consumption and improving the power saving efficiency during operating in the PSR mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing apparatus for generating image frames to be displayed on a display panel, comprising:
   a first memory, for storing an input frame;
   a plurality of image processing circuits which are coupled in sequence, for sequentially performing respective image processing operations on the input frame such that a last-stage image processing circuit among the plurality of image processing circuits generates a first intermediate frame;
   a first image processing circuit in front of a dithering circuit, coupled to the first memory and coupled to the last-stage image processing circuit, for performing a first image processing operation on the first intermediate frame to generate a second intermediate frame and writing the second intermediate frame into the first memory to replace the input frame with the second intermediate frame; and
   the dithering circuit, coupled to the first image processing circuit and the first memory, for performing a dithering operation on the second intermediate frame transmitted from the first image processing circuit to generate a first output frame and performing the dithering operation on the second intermediate frame read from the first memory to generate a second output frame next to the first output frame.

2. The image processing apparatus of claim 1, wherein the input frame is a frame to be processed by the image processing apparatus under a panel self-refresh mode.

3. The image processing apparatus of claim 1, wherein the second output frame is generated by the dithering circuit without being processed by the plurality of image processing circuits and the first image processing circuit.

4. The image processing apparatus of claim 1, wherein the plurality of image processing circuits and the first image processing circuit are in a low power consumption state during generating the second output frame.

5. The image processing apparatus of claim 4, wherein the dithering circuit periodically reads the second intermediate frame from the first memory and performs the dithering operation on the second intermediate frame to generate subsequent output frames after the second output frame until the plurality of image processing circuits leave the low power consumption state.

6. The image processing apparatus of claim 1, further comprising:
a receiver circuit, for receiving the input frame from a processor circuit and storing the input frame into the first memory.

7. The image processing apparatus of claim 6, wherein the receiver circuit stores the input frame into the first memory in response to receiving a panel self-refresh mode command.

8. The image processing apparatus of claim 1, wherein the image processing apparatus comprises a mura compensation circuit which is an image processing circuit among the plurality of the image processing circuits and the first image processing circuit, for performing mura compensation, and further comprises a second memory for storing data being used for mura compensation.

9. An image processing method of an image processing apparatus for generating image frames to be displayed on a display panel, the image processing apparatus comprising a first memory, the image processing comprising:
storing an input frame into the first memory;
sequentially performing respective image processing operations on the input frame to generate a first intermediate frame by a last-stage image processing circuit among a plurality of image processing circuits which are coupled in sequence;
performing a first image processing operation on the first intermediate frame to generate a second intermediate frame and writing the second intermediate frame into the first memory to replace the input frame with the second intermediate frame by a first image processing circuit, wherein the first image processing circuit is disposed in front of a dithering circuit and coupled to the last-stage image processing circuit of the plurality of image processing circuits; and
performing a dithering operation on the second intermediate frame transmitted from the first image processing circuit to generate a first output frame by the dithering circuit and performing the dithering operation on the second intermediate frame read from the first memory to generate a second output frame next to the first output frame by the dithering circuit.

10. The image processing method of claim 9, wherein the input frame is a frame to be processed by the image processing apparatus under a panel self-refresh mode.

11. The image processing method of claim 9, wherein the second output frame is generated by a dithering circuit without being processed by the plurality of image processing circuits and the first image processing circuit.

12. The image processing method of claim 9, further comprising:
the plurality of image processing circuits and the first image processing circuit entering in a low power consumption state during generating the second output frame.

13. The image processing method of claim 12, further comprising:
periodically reading the second intermediate frame from the first memory and performs the dithering operation on the second intermediate frame to generate subsequent output frames by the dithering circuit after the second output frame until the plurality of image processing circuits leave the low power consumption state.

14. The image processing method of claim 9, further comprising:
receiving the input frame from a processor circuit and storing the input frame into the first memory.

15. The image processing method of claim 14, wherein the step of storing the input frame into the first memory comprises storing the input frame into the first memory in response to receiving a panel self-refresh mode command.

* * * * *